(12) United States Patent
Knott (10) Patent No.: US 9,305,055 B2
(45) Date of Patent: Apr. 5, 2016

(54) METHOD AND APPARATUS FOR ANALYSING DATA PACKETS

(75) Inventor: Christoph Knott, Maitenbeth (DE)

(73) Assignee: DESOMA GMBH, Rosenheim (DE)

(*) Notice: Subject to any disclaimer, the term of this patent is extended or adjusted under 35 U.S.C. 154(b) by 317 days.

(21) Appl. No.: 13/884,529

(22) PCT Filed: Feb. 1, 2012

(86) PCT No.: PCT/EP2012/051648
§ 371 (c)(1),
(2), (4) Date: May 9, 2013

(87) PCT Pub. No.: WO2012/110314
PCT Pub. Date: Aug. 23, 2012

(65) Prior Publication Data
US 2013/0232137 A1 Sep. 5, 2013

(30) Foreign Application Priority Data
Feb. 17, 2011 (EP) .................................. 11001323

(51) Int. Cl.
G06F 17/30 (2006.01)
H04L 12/26 (2006.01)
H04L 29/06 (2006.01)

(52) U.S. Cl.
CPC .......... G06F 17/30477 (2013.01); H04L 43/18 (2013.01); H04L 63/1416 (2013.01); H04L 63/1425 (2013.01)

(58) Field of Classification Search
CPC .......... G06F 11/3048; G06F 17/30864; G06F 17/30477
See application file for complete search history.

(56) References Cited

U.S. PATENT DOCUMENTS

| | | | | |
|---|---|---|---|---|
| 6,363,429 | B1* | 3/2002 | Ketcham ................. | H04L 65/80 709/231 |
| 6,615,262 | B2* | 9/2003 | Schweitzer et al. | H04L 41/0631 370/253 |
| 6,977,940 | B1* | 12/2005 | Ahlfors et al. ................ | 370/412 |
| 8,255,938 | B2* | 8/2012 | Lee et al. ......................... | 725/19 |
| 2005/0055399 | A1 | 3/2005 | Savchuk | |
| 2008/0120721 | A1 | 5/2008 | Moon et al. | |
| 2009/0077252 | A1* | 3/2009 | Abdo et al. .................... | 709/231 |

(Continued)

OTHER PUBLICATIONS

International Search Report PCT/ISA/210 for International Application No. PCT/EP2012/051648 Dated May 8, 2012.
Written Opinion of the International Searching Authority PCT/ISA/237 for International Application No. PCT/EP2012/051648 filed Feb. 17, 2011.

(Continued)

*Primary Examiner* — Debbie Le
(74) *Attorney, Agent, or Firm* — Harness, Dickey & Pierce, P.L.C.

(57) ABSTRACT

A method is disclosed for extracting a data packet including metadata and useful data from a datastream. The metadata and useful data are stored in a first and second memory area, with an association being maintained. A transaction number is formed based upon a signature of the data packet. The useful data or partially reconstructed network sessions may be searched for at least one search term, and at least one successful search may be recorded in the metadata. If the data packet is currently not being processed, the associated useful data may be read from the buffer store and a flag may be set in the metadata which indicates that this data packet is now being processed. If all the metadata and the useful data from a network session have been read and the search for the search term was successful, the network session is then reconstructed.

11 Claims, 6 Drawing Sheets

(56) References Cited

U.S. PATENT DOCUMENTS

| | | |
|---|---|---|
| 2009/0138945 A1 | 5/2009 | Savchuk |
| 2010/0195538 A1 | 8/2010 | Merkey et al. |
| 2011/0238723 A1* | 9/2011 | Weintraub ............ G06Q 30/02 709/201 |
| 2012/0099656 A1* | 4/2012 | Ohya et al. ............... 375/240.23 |

OTHER PUBLICATIONS

European Search Report for EP11001323.2 Dated Nov. 22, 2011.

International Preliminary Report on Patentability including annexes International Application No. PCT/EP2012/051648 dated Aug. 14, 2012.

* cited by examiner

METHOD AND APPARATUS FOR ANALYSING DATA PACKETS

PRIORITY STATEMENT

This application is the national phase under 35 U.S.C. §371 of PCT International Application No. PCT/EP2012/051648 which has an International filing date of Feb. 1, 2012, which designated the United States of America and which claims priority to European patent application number EP 11001323.2 filed Feb. 17, 2011, the entire contents of each of which are hereby incorporated herein by reference.

FIELD

At least one embodiment of the invention generally relates to a method of analyzing data packets in packet-based communications networks, the data packets comprising metadata and useful data and preferably being transmitted in a datastream as part of a network session.

BACKGROUND

An analysis of data packets in a datastream is performed in many areas, for example in order to filter or categorize the data with respect to their content. An analysis of the content of individual data packets and network sessions is required particularly when monitoring datastreams. With known methods, copies are produced of the data packets that are transmitted via a data line and these are either stored for later processing, or the data packets are analyzed in real time.

However, the storage of all data packets in a datastream requires very large and powerful data memories. In addition, high processing power is required for the subsequent analysis of the stored data. However, systems of this kind are usually unsuitable for permanent monitoring, because over a longer period of time, such a large amount of data is usually stored in the data memory that timely analysis of this data can no longer be ensured. Memory overflow can also occur.

Real-time capable analysis systems provide for immediate analysis of data transmitted via the data line and are fundamentally suitable for permanent monitoring of data traffic, however when using these systems, it is usually not possible to reconstruct the entire content of a network session, because the data packets are often transmitted twice or not in chronological order via the network. This occurs particularly in load-balanced and redundant networks. These kinds of real-time capable analysis systems therefore cannot guarantee completely secure monitoring, because for example, key words whose common occurrence in a message or a network session is searched for, may be distributed among different data packets, so that these key words are then untraceable.

SUMMARY

At least one embodiment of the invention provides a method and/or an apparatus for analyzing data packets, and/or the content of the useful and metadata in data packets, which will enable permanent monitoring of the data traffic and secure detection of the content that is to be monitored.

A method and an apparatus are disclosed. The features of additional embodiments and advantageous further developments are specified in the sub-claims.

Initially, in terms of at least one embodiment of the invention, the data packets that are to be analyzed are extracted from the datastream. To this end, a copy is preferably made of each of these data packets. A signature is then generated for each data packet extracted. A hash function determined by a hash code is preferably used as a signature, whereby identical data packets display the same hash code. The data packet is then stored in a buffer, the metadata being stored in a first memory area and the useful data in a second memory area in such a way that an association between the useful data and the metadata of a data packet is maintained in the buffer store as well. This can be realized, for example, by using so-called pointers.

According to an example embodiment, wherein the first memory area and the second memory area of the buffer store are divided into segments, the useful data is assigned to the respective metadata by way of the useful data and the metadata of a data packet being filed in respectively corresponding segments of the first and second memory areas. For example, it can be provided that the segment number relating to the first memory area, in which the metadata are stored, corresponds to the segment number of the second memory area in which the useful data of this data packet are stored. If is, of course, also conceivable, using the segment numbers of a memory area, to calculate the segment numbers of the other memory area according to a predetermined calculation rule, in order to produce, in this way, a clear relationship between the metadata and the useful data.

When there is a plurality of known memory elements, which being present can be used as the basis for an embodiment of the inventive buffer store, a so-called transaction number for access to the memory will be used for the process of saving. With this kind of buffer store, it is expedient to use the signature of the data packet as the transaction number. In particular, when a plurality of processing units is provided that performs an extraction of the data packets from the datastream, the unique transaction number ensures that each data packet is stored in the buffer only once. If there is an attempt to register a data packet with the same transaction number a second time, this will be prevented, for example by the logic of the memory element. In this way, particularly economical use of the memory capacity is achieved because each extracted data packet can only be stored once. This property also enables particularly simple realization of a scalability of an embodiment of the inventive apparatus, as will be shown below.

In order to enable an analysis of the content of the extracted data packets, an embodiment of the invention provides that before or after the metadata and the useful data of the data packet are stored, the useful data will be searched for at least one search term. To this end it is advantageous to carry out at least one partial reconstruction of the network session, so that it will also be possible to use search terms beyond packet limits. To this end, the packets of one network session will preferably be sorted chronologically, according to their arrival, or by sequence numbers, the data of levels 5-7 being written according to the so-called OSI layer model in a ring buffer, and the search then being carried out in this ring buffer. For example, the size of the ring buffer can amount to 1600 bytes per network session if the maximum packet size in a network session amounts to 1500 bytes.

The actual search can, be defined in particular by way of so-called regular expressions. The success of the search in the metadata will preferably be indicated, for example, by setting an identifier, a so-called flag, when there is a successful search. It can therefore already be recognized on the basis of the metadata of the data packets of a network session, whether the useful data has the search term. Because the metadata as a rule take up less memory capacity, quicker access to this data is possible in the buffer store. Useful data is preferably also stored when the search of this useful data was not successful. Because the search term can also occur in another packet of the network session, it is ensured in this way that all data packets for the reconstruction of the network session are available, and that the network session can therefore be fully reconstructed.

According to an embodiment of the invention, for further analysis of the data, the data packets of one network session are completely reconstructed, so that the original information, for example the content of an e-mail, a transmitted document, or a video is once again completely available. To this end, the metadata are first read from the buffer store using a reconstruction module. When the data is read out, first a check is made to determine whether an identifier has been set in the metadata, the identifier showing whether the metadata is being processed now. If this type of identifier has already been set, the processing of the metadata is interrupted. If not, the processing continues and the identifier is set. In this way, it is ensured that when a plurality of reconstruction modules is present, different network sessions will be generated by a plurality of reconstruction modules in redundant processing. The identifier therefore indicates whether a reconstruction module is currently engaged in reconstructing the network session that includes this data packet, and in that way again enables a scaling of the entire system that can be realized in a particularly simple manner.

If all metadata and useful data of a network session have been read, and if the search for the search term was successful in at least one of the useful data items, as can be seen for example from the identifier in the metadata described above, which displays the result of the search, the useful data will be returned to its original sequence and in that way the network session will be reconstructed.

Preferably after the reading of the last data packet of a network session, a notation will be placed in the metadata belonging to this network session, which is stored in the buffer that this network session has been reconstructed and/or the data packets of this network session have been read from the buffer store. The memory locations concerned will then be available once again and can be used for storing additional data packets. In addition, with this notation, the completeness of the reconstruction, or on the other hand a crash of a reconstruction module, can be identified. This can be achieved by way of the notation being deleted when there is successful reconstruction of the network session. However, if the notation remains in place longer than a predefined period of time, it will be concluded that the reconstruction module did not function properly, for example due to a system crash of this reconstruction module. Provision can then be made for this reconstruction module to be tested and/or for this network session to be reconstructed by another reconstruction model.

Using an embodiment of the inventive method and an embodiment of the inventive apparatus, it is possible to analyze the data packets of one network session virtually in real time, and if it is detected that a certain search term occurs in a data packet, the entire network session will be made available for further processing or storage. An additional advantage is the possibility of a particularly simple scaling of the entire system. Thus, even during the operation of an embodiment of the inventive apparatus, or as the case may be during implementation of the inventive method, individual modules can be connected or removed. For example, extraction modules that carry out the extraction of data packets from the datastream can be added or removed. With appropriate memory management, memory capacity can also be enlarged or reduced, and reconstruction modules that carry out the reconstruction of the network sessions can be added, without the necessity of interrupting the analysis of the datastream in order to do so.

According to an advantageous further development of an embodiment of the invention, an analysis of the useful data of a network session is carried out in order to identify at least one file type of a file transmitted within the network session. This can be done for example by way of a search that is oriented on the so-called MIME type. A file identified in this way can then be extracted from the network session and made available for further processing. Here, it is particularly advantageous to store, together with the extracted data, additional data that enables an identification of the transmitter or the recipient. In particular, provision can be made for analysis of the metainformation of the respective network session, which is present in the useful data, for example in order to identify communication patterns. This can be done independently of the communication protocol used, on the basis of a heuristic analysis. For example, this type of analysis can provide information on the operating system used by the transmitter and on any routers or firewalls present that the transmitter might have had installed.

It is particularly advantageous if, after the reconstruction of the network session, there is an evaluation of the useful data transmitted in the network session, taking into consideration network protocols of the application layer (so-called layers 5 to 7 of the OSI layer model).

According to an example embodiment, the first memory area and the second memory area of the buffer store are configured as a ring buffer. On the one hand, this enables rapid access to the individual memory segments and provides a defined reusability of the individual segments and on the other, it prevents the occurrence of a memory overflow.

Preferably, the assignment of the metadata stored in the buffer to the stored useful data will take place via a unique segment number of the respective memory area. In addition, the buffer store is advantageously configured such that permission to store data depends on the result of a check of the transaction number used. This prevents duplicates of data from being stored in the buffer, for example when the recipient of a data packet has requested the packet again, or because a plurality of extraction models is present which have read the same data packet and now want to register it in the buffer store.

Compared to the conventional methods and systems, an embodiment of the invention has the advantage that the data packets of a network session are examined virtually in real time, and that at least in the event that a search is successful, the entire network session will be made available.

The initially cited aim of an embodiment is also achieved, in particular, by way of a computer program that is executable on a device for analyzing the content of data packets of a datastream, for example at a network node, and is programmed to implement an embodiment of the inventive method. In this way, the computer program, through the individual process steps, is just as much a constituent of an embodiment of the invention as the method itself.

BRIEF DESCRIPTION OF THE DRAWINGS

Additional advantageous features of the invention can be seen in the embodiments presented and described in the figures below.

DETAILED DESCRIPTION OF THE EXAMPLE EMBODIMENTS

Figure 1:
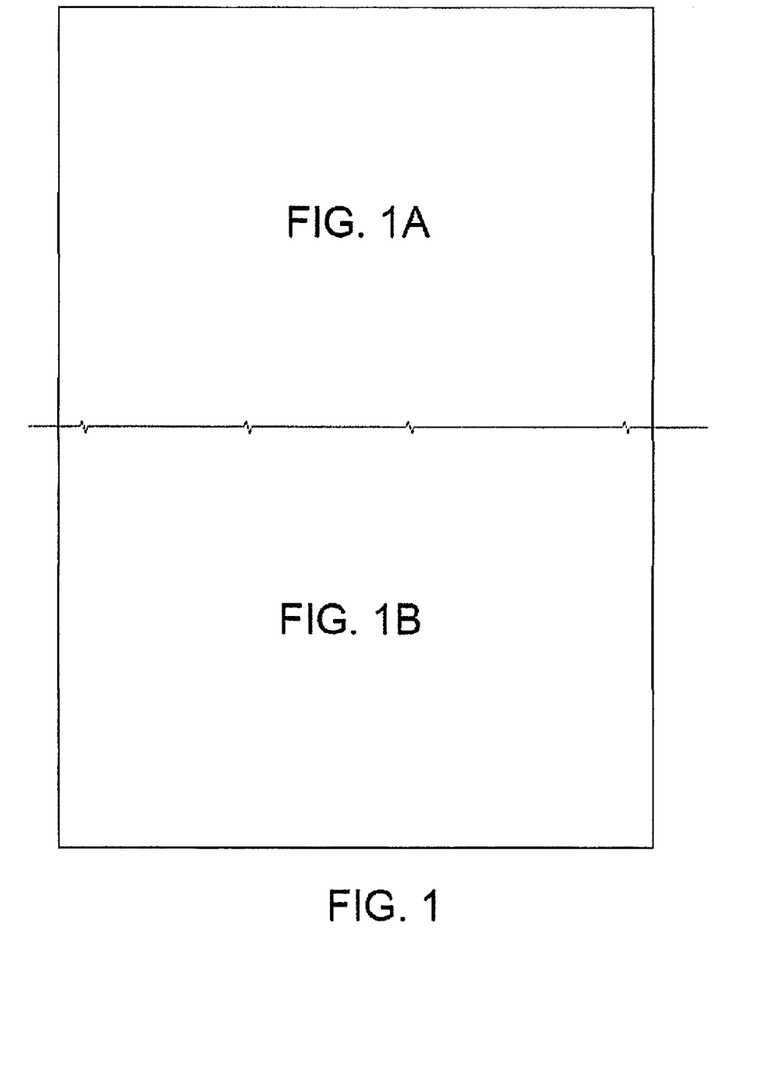
FIG. 1 illustrates FIGS. 1A and 1B, depicting a block diagram of an apparatus suitable for implementing the inventive method according to a first embodiment.
Figure 1A:
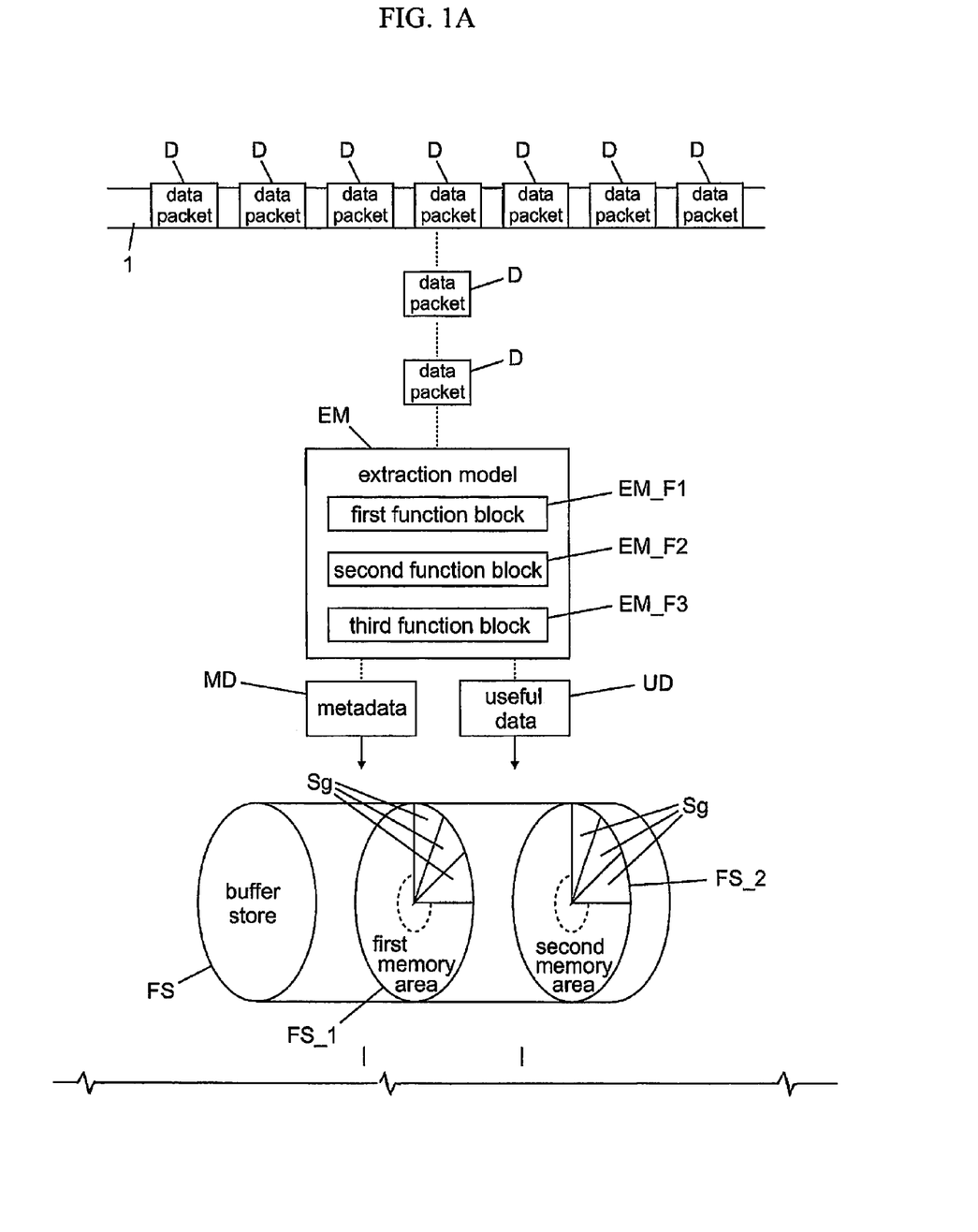
FIG. 1A illustrates a first portion of the block diagram of FIG. 1.
Figure 1B:
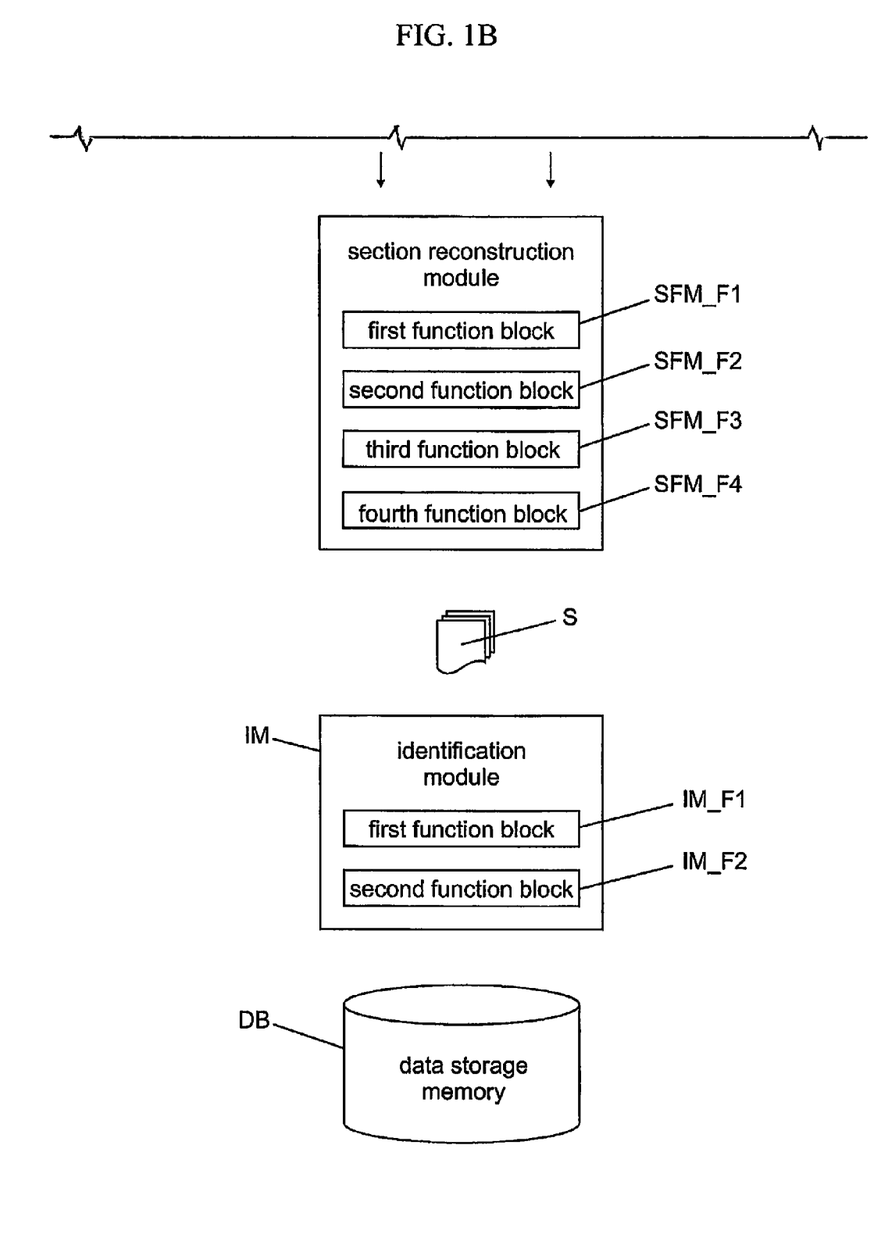
FIG. 1B illustrates a second portion of the block diagram of FIG. 1.

FIG. 1, including FIGS. 1A and 1B, depicts a block diagram of an apparatus suitable for implementing the inventive method according to a first embodiment. FIG. 1A illlustrates a first portion of the block diagram of FIG. 1 and FIG. 1B illustrates a second portion of the block diagram of FIG. 1, according to the first embodiment.

In the block diagram shown in FIG. 1, data packets D are represented which are transported via a data line 1. The data packets are transmitted via the data line, for example, according to the internet protocol (IP). The data packets D shown in FIG. 1 represent only a small section of the data traffic typically carried via a data line 1.

An extraction model EM receives data packets extracted from the datastream. For further processing of the data packets, the extraction model EM comprises a plurality of function blocks EM_F1, EM_F2, EM_F3. In the first function block EM_F1, a signature of the data packet being processed is produced. To this end, a hash code is generated, for example, by means of a hash function, and assigned to the data packet. In this way, the signature allows—aside from the limits due to the hash function—clear identification of the data packet.

In the second function block EM_F2, parts of the network session are reconstructed and their data searched for one or a plurality of definable characters or character strings, which are hereafter designated as key words. To this end, the function block EM_F2 preferably works on the basis of so-called regular expressions. The key words that are to be searched for, or as the case may be the regular expressions, are specified for the extraction module EM via a suitable user interface. The results of this search are stored in the metadata. For example, each currently designated search term, or as the case may be regular expression, is assigned an identifier. If the search for a search term has been successful, the identifier assigned to this search term will be stored in the metadata. In this way, as the analysis progresses, it can be quickly determined, by means of the metadata of a data packet, whether certain character strings are present in the associated useful data.

In the third function module EM_F3, the data packets are separated into the metadata MD and the useful data DU respectively, which are then stored in a buffer store FS, which is for example configured as a ring buffer. Here, all metadata of the data packets are saved in a first memory area FS_1 and the useful data in a second memory area FS_2. In the embodiment shown in FIG. 1, the storage of the metadata and the useful data is done in the corresponding segments Sg of the first memory area and the second memory area respectively. One segment of the first memory area for recording the metadata comprises, for example, 32 bytes, and one segment of the second memory area for recording the useful data comprises, for example, 64 kilobytes. Advantageously, the size of the segments is dimensioned according to the network protocol used, so that for all anticipated protocols, storage of the useful data and the metadata of one data packet are possible, in each case, in one segment. With the dimensioning referred to above, packets can be saved according to the protocol IPV4, for example.

According to one embodiment of the inventive apparatus, each of the memory areas comprises approximately 5 million segments, which produces a capacity of more than 300 gigabytes for the buffer store, if the segment size is chosen as in the example above. Apart from the network protocols, the size of the segments and the number of the segments depends on other factors as well, for example the number of extraction modules in a network that might possibly be monitored.

For the storage of the metadata and the useful data in the buffer, a transaction number is preferably used that corresponds to the signature of the data packet generated by the extraction module EM or is at least formed from the signature. For example, for storing the metadata, the signature is used unchanged as the transaction number, and for the storage of useful data, the value of the signature is incremented by the value 1.

Furthermore, in FIG. 1 a session-reconstruction module SFM_is shown which also comprises a plurality of function blocks. In a first function block FSM_F1, the metadata area is read out of the buffer. Here, these metadata are only read out if they belong to a network session that is currently being processed. This can be recognized on the basis of the identifier present in the metadata.

Figure 2:
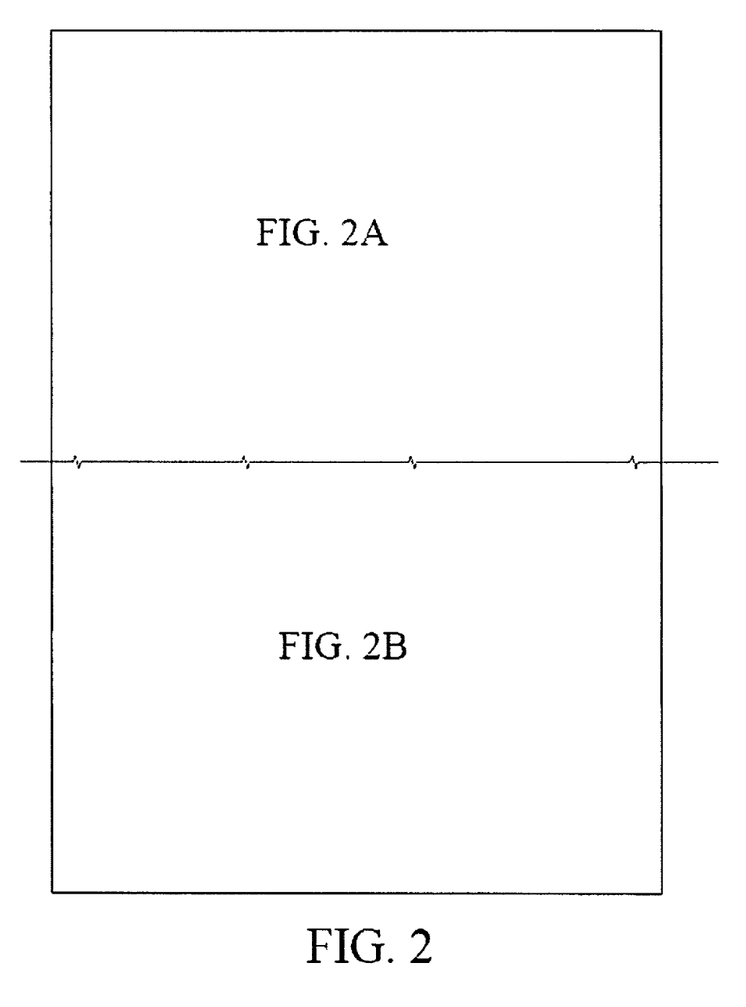
FIG. 2 illustrates FIGS. 2A and 2B, depicting a block diagram of an apparatus suitable for implementing the inventive method according to a second embodiment.

In a second function block SFM_F2 according to an advantageous embodiment, a check is made to determine whether an identifier has been set in the metadata, the identifier indicating whether this data is being processed now. This is a particular advantage when a plurality of session-reconstruction modules is present, as shown in FIG. 2 below. In this case it can then be established whether this data packet has already been processed by another session-reconstruction module. If that is the case, the session-reconstruction module which has been reading out this module will recognize that this network session is already being processed by another session-reconstruction module and would therefore select another data packet, or as the case may be another network session for processing. However, if this identifier has not been set, the session-reconstruction module would set the corresponding identifier and indicate that this data packet, or as the case may be this network session is now being processed by this module.

An analysis of the read-out metadata takes place in a function block SFM_F3. Here it can be determined, for example, whether the identifier indicating a successful search has been set in the metadata. If all metadata of a network session have been read out, and the identifier has not been set in any of the metadata, it is possible to interrupt the processing here because it can be assumed that further analysis serves no purpose. However, if the identifier has been set in at least one of the metadata, the network session will be reconstructed in a function block SFM_F4. To this end, the useful data, for example using their sequence numbers, will be restored to their original sequence. If the useful data has not yet been read out of the buffer, this is now done. The useful data is then sorted and in this way the original content of the network session is restored. As a rule, it will be complete, however if individual packets have been lost, the network session cannot of course be completely reconstructed.

The network session that is comprised, for example, of a plurality of documents and/or media data, such as video data, for example, and music data, or other data of one data type, is then delivered to an identification module IM_for an analysis of the data that are now available as a network session. The identification module can also comprise a plurality of function blocks. For example, in a first function block IM_F1, identification, or as the case may be decryption and storage of all relevant information of the application layer according to OSI level 5 to level 7 is carried out. Here there will be preferably decryption and/or identification in a plurality of layers. For example, in a first layer, a MIME-based data extraction will be carried out. This takes place on the basis of data types (for example PDF, JPEG, GIF, RTP . . . ). This extraction is initially independent of the network protocol used.

A heuristic data extraction can take place in a further step. Here there is an evaluation of metadata of the network session (not to be confused with the metadata of the data packet) in order to identify communication patterns. This too takes place independently of the network protocol used. In a further step, there can be a protocol-based evaluation of the network session data. This can be done, for example, according to the RFC standard.

In an additional function module IM_F2, it can be provided that faulty or interrupted network sessions are evaluated complementarily or separately.

The data generated in the session-reconstruction module SFM_and the identification module IM_are stored—at least partially—in an additional data storage memory DB, which is created, for example, in the form of a so-called data warehouse on the basis of a document-oriented database. The data storage memory will preferably enable efficient full-text indexing on the basis of so-called B* trees. Additional embodiments can provide for semi-structured data storage and a versioning, or as the case may be, proof of change of all data volumes.

Preferred embodiments of the database DB have a plurality of interfaces for access to the database. These include, for example, JSON (Java Script Object Notation) for connections to so-called application servers. Additional interfaces can be text-based or placed directly on the database, which for this purpose will advantageously have a defined programming interface. Furthermore, the database DB can have a connection to additional evaluation modules which carry out an extended evaluation of the data, for example on the basis of a method subsumed under the term data mining.

Figure 2A:
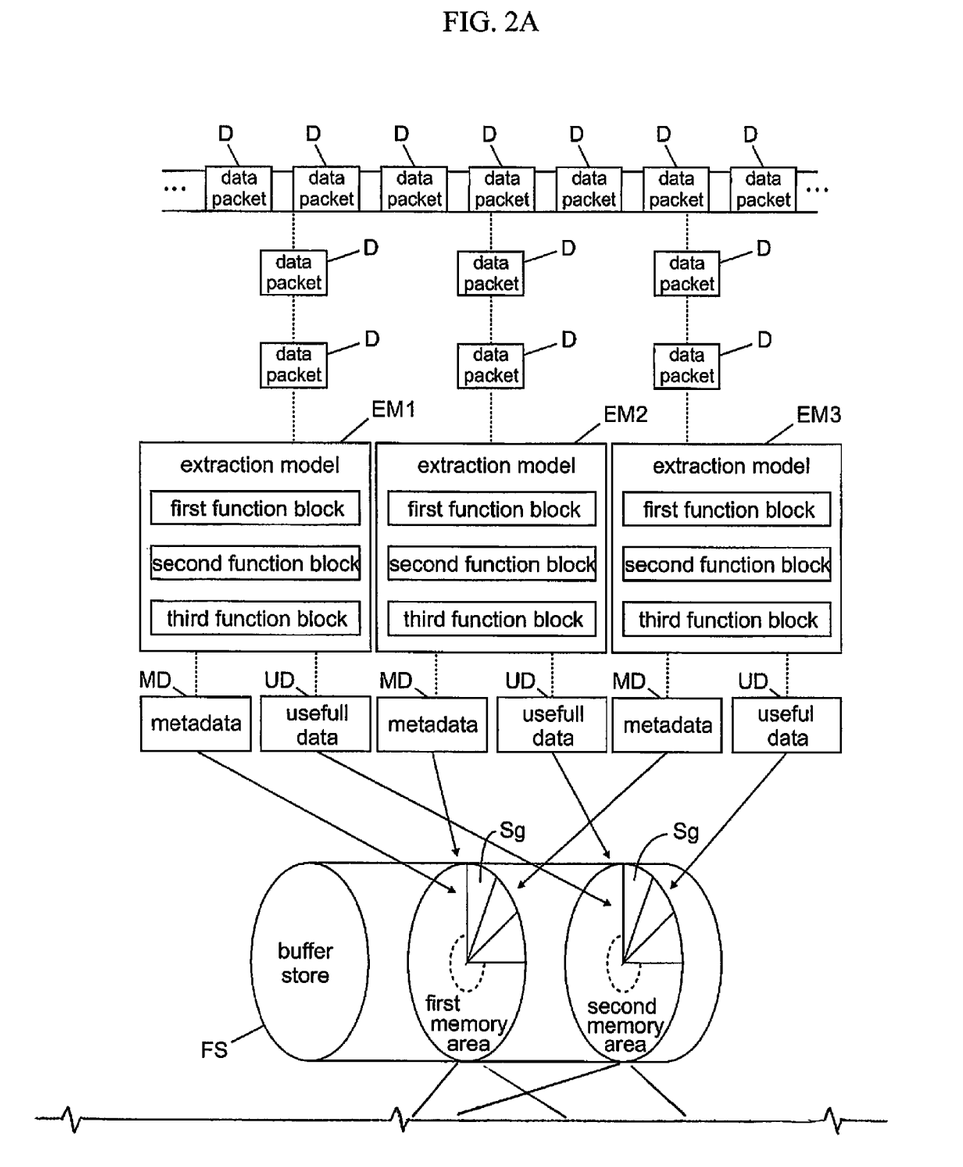
FIG. 2A illustrates a first portion of the block diagram of FIG. 2.
Figure 2B:
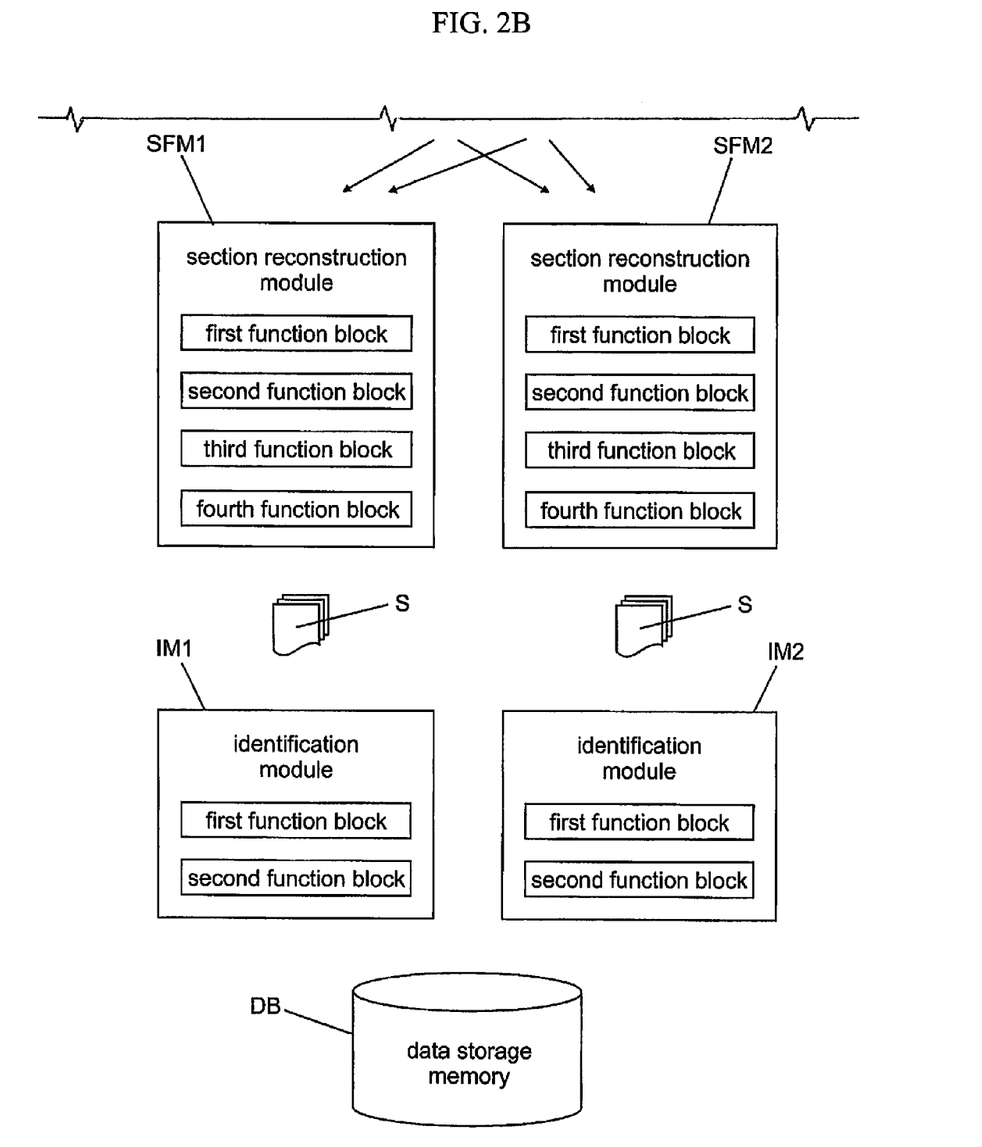
FIG. 2B illustrates a second portion of the the block diagram of FIG. 2.

FIG. 2, including FIGS. 2A and 2B, depicts a block diagram of an apparatus suitable for implementing the inventive method according to a second embodiment. FIG. 2A illlustrates a first portion of the block diagram of FIG. 2 and FIG. 2B illustrates a second portion of the block diagram of FIG. 2, according to the second embodiment.

FIG. 2 presents a further possible embodiment of the invention which illustrates the advantages of the invention in relation to scalability. The embodiment shown in FIG. 2 comprises a plurality of extraction modules EM1, EM2, EM3; a plurality of session-reconstruction modules SFM1, SFM2; and a plurality of identification modules IM1, IM2. The modules shown in FIG. 2 are to be understood only as examples. Any number of each module could of course be provided.

As initially described, an embodiment of the invention makes it possible, for example, to add individual modules, even during the operation of an embodiment of an inventive apparatus, or as the case may be during the implementation of an embodiment of the inventive method, without additional changes being required. This is achieved, among other things, by using the signatures of the data packets, which are preferably calculated by way of a hash function, and the use of these signatures as transaction numbers in the process of storing the data packets in the buffer store FS.

In the case of the embodiment shown in FIG. 2, it is possible that individual extraction modules EM1, EM2, EM3, will extract the same data packet from the datastream. In calculating the signature, all extraction modules use the same hash function, generating with it the same signature. If an extraction module tries to store a data packet, or as the case may be the metadata and the useful data of a data packet in the buffer, the buffer will only allow this if the transaction number has not yet been used within a predefined time window. That, however, is precisely the case, if this data packet has already been registered in the buffer store by another extraction module. The plurality of extraction modules ensures that each of the data packets can actually be processed.

It is, in particular, possible to use extraction modules with lower performance levels, because a data packet that is not extracted due to a low processing speed of an extraction module will be processed by the following module or one of the following extraction modules. Thus, if it turns out during the operation of an embodiment of the inventive apparatus that the data traffic has increased, and that an adjustment to the system's performance is therefore required, this can simply be done by adding an additional extraction module or a plurality of extraction modules.

A scalability of the session-reconstruction module is just as easily possible. This is achieved by way of the mechanism initially described above, where the session-reconstruction module, when reading the metadata out of the buffer store, starts by checking whether an identifier has been set there, said identifier indicating that the network session to which this data packet belongs has already been processed by another session-reconstruction module.

Alternatively and/or supplementary to this, an identifier can be stored in the metadata itself, the identifier showing that the data packet in question is already being processed by a session-reconstruction module. If a session-reconstruction module detects this state, it will select a different network session and then start reading the associated data packets from the buffer store. If a session-reconstruction module has read out all of the data packets of a network session, this will also be indicated by way of an appropriate identifier in the buffer store or by way of appropriate identifiers in the metadata of this network session. This prevents one and the same network session from being processed more or less in parallel, or successively by a plurality of session-reconstruction modules. It also ensures that each network session is reconstructed only once.

An advantageous embodiment provides that the identifier which indicates that a network session and/or a metadata item of a network session is currently being processed, will automatically lose its validity after a predetermined time. This ensures that a session-reconstruction module cannot block the reconstruction of a network session, should the module crash or be removed from the system. This ensures that even during the operation of an embodiment of the inventive apparatus, a session-reconstruction module can be removed without adversely impacting the operation of the entire system.

The number of individual processing modules is determined, on the one hand, by their availability, and on the other hand by the number of data packets to be analyzed and the capacity of the individual module. Using an embodiment of the inventive method it is particularly possible, for example, to interconnect individual extraction modules with different capacities into a single system without making additional provisions.

An embodiment of the invention also enables active intervention in the data traffic. If it is determined, for example, that in a network session unwanted data is being transmitted, or that unwanted data is often transmitted from a certain transmitter, the extraction module can be designed such that data is not immediately copied during extraction, but rather that these data packets are actually removed and only fed back in after the analysis. According to another embodiment, it is provided, in the event of detection of unallowed content within a network session, that this session is interrupted, or the transmission of data from one transmitter is completely stopped.

The buffer store can be realized on the basis of a plurality of different memory systems, such as, for example: NAS, SAN, local hard disks, a RAM disk, or other known memory systems. The system is also independent of the communication protocol used. For example, NFS, CIFS, FCP, SSP, SATA, etc., can be used here.

For a data transmission based on the Internet protocol, the session-reconstruction module can be realized for a passive data analysis on the basis of a TCP stack optimized for this purpose. The session-reconstruction module can be configured such that an extraction and storage of all information is done in the layers L2 to L4 of the OSI, thus for example IP, TCP, UDP, and added to a heuristic analysis. This analysis is dependent on the analysis of information from the application layer (L5 to L7 of the OSI).

An embodiment of the proposed invention can be realized, in particular, with the use of open standards, open interfaces, and open architectures, and can be very easily integrated into existing systems by way of the clearly defined interfaces. With regard to security, an embodiment of the inventive system has the advantage that it can be realized without problems, in such a way that the availability of the entire system does not depend on the availability of an individual module. Thus, in this system, there is no so-called single point of failure. An additional advantage of the scalability is that during the operation of the system, individual modules can be updated without this impairing overall operation.

If required, a plurality of different analysis processes can be carried out within the identification module. In addition to the previously mentioned MIME-based analysis, by which virtually all known file types can be recognized, it can of course also be provided that the data transmitted in a compressed form are extracted. It is particularly advantageous if an identification of HTML-based data includes the possibility of automatically reloading, for example from the Internet, static contents which are therefore not explicitly reproduced within a network session, in order to independently complete the network session in this way.

The heuristic analysis can apply to the information in the data packets and can here include a detector to recognize manipulations to the TCP checksums, an operating system identification, and an analysis of networks in which routers or firewalls are used. A heuristic analysis of the useful data can include URLS, e-mail addresses, various logon information, and user names, SSL/TLS recognition, Skype recognition and/or DNS queries. The heuristic analysis can of course be adapted to the type of network session and, depending on the type of network session detected, use additional analysis techniques. For example, the type of chat can be recognized. Additional information can also be inferred from this. It can be determined in particular whether a communication is taking place with non-allowed protocols or with non-allowed servers.

The embodiments shown in FIGS. 1 and 2 should only be considered as examples that serve to explain embodiments of the invention. Other embodiments that also illustrate the invention might realize the invention in a different form. For example, the individual function blocks inside the modules are to be taken as examples only. Each module can include additional function blocks, or only part of the function blocks shown in FIGS. 1 and 2. In addition, it can be provided that the function blocks are not explicitly realized as such, but rather that the module in question has only one or a plurality of the corresponding functionalities. Furthermore, the division of the overall functionality shown in the FIGS. 1 and 2 primarily serves the purpose of illustration. It can of course also be provided that the modules are further subdivided, or the functionalities of a plurality of modules are at least partially integrated into other modules.

The invention claimed is:

1. A method of analyzing a data packet in a datastream, the data packet including metadata and useful data, the method comprising:
   extracting the data packet from the datastream;
   assigning the data packet a unique signature;
   storing the data packet in a buffer store, the metadata being stored in a first memory area and the useful data in a second memory area such that an association between the useful data and the respective metadata is maintained;
   generating a transaction number, used for executing the respective storage operation, on the basis of the signature of the data packet;
   searching, before or after the storing of the data packet, the useful data for at least one search term, wherein at least one successful search of the metadata is marked by setting a search-identifier;
   reading the metadata from the buffer store and reading, upon a check indicating that the data packet including the read metadata is not now being processed, the associated useful data from the buffer store and setting an identifier in the metadata stored in the buffer store, said identifier indicating that the data packet is now being processed; and
   reconstructing, upon all metadata and useful data from a network session being read and the search for the search term being successful in at least one of the useful data items, the network session by arranging the useful data in an original order.

2. The method of claim 1, wherein, after the reading of the last data packet in a network session, marked notation is placed in the metadata belonging to the network session which are saved in the buffer store to indicate that the metadata are being processed.

3. The method of claim 1, wherein an analysis of the useful data of a reconstructed network session is carried out in order to identify at least one file-type of at least one file transmitted during the network session.

4. The method of claim 1, wherein the meta-information in the useful data of the network session is analyzed.

5. The method of claim 1, wherein an analysis of the useful data transmitted during the network session is done taking into account the network protocols of the application layer.

6. The method of claim 1, wherein the signature of the data packet is determined by way of a hash function.

7. The method of claim 1, wherein the first memory area and the second memory area of the buffer store are each configured as a ring buffer.

8. The method of claim 1, wherein an assignment of the metadata stored in the buffer store to the stored useful data is done by way of a unique segment number of the respective memory area.

9. The method of claim 1, wherein the buffer store only allows storage of metadata and useful data depending on the outcome of a validation of the transaction number used.

10. A non-transitory computer readable medium, comprising a computer program, programmed to implement the method of claim 1 when executed.

11. An apparatus for performing an analysis of a data packet in a datastream, the data packet including metadata and useful data and being part of a network session comprising at least the data packet, the apparatus comprising:

- at least one function block, configured to create a unique signature of the data packet;
- a buffer store including a first memory area and a second memory area, wherein the buffer store is configured to enable a storage of the metadata in the first memory area and a storage of the useful data in a second memory area in such a way that an association between the useful data and the respective metadata is maintained, wherein a transaction number, used to carry out the storage, is formed subject to the signature of the data packet;
- at least one function module, configured to make it possible to carry out a search of the useful data for at least one search term, before or after storage of the data packet in the buffer store and configured to mark at least one successful search in the metadata by setting a search-identifier; and
- at least one session-reconstruction module, including a portion to read metadata from the buffer store and a function block to check whether the metadata read is currently being processed;
- a module to set an identifier in the metadata, stored in the buffer store, to indicate that the metadata read is now being processed, to read all useful data of the network session stored in the buffer store upon a search-identifier being set in at least one data packet of the network session and to reconstruct the useful data in an original order.

* * * * *